United States Patent
VanAntwerp et al.

(10) Patent No.: US 11,936,760 B2
(45) Date of Patent: *Mar. 19, 2024

(54) METHOD AND SYSTEM OF GENERATING GENERIC PROTOCOL HANDLERS

(71) Applicant: State Farm Mutual Automobile Insurance Company, Bloomington, IL (US)

(72) Inventors: John M. VanAntwerp, Normal, IL (US); Dan Kalmes, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,745

(22) Filed: Mar. 6, 2023

(65) Prior Publication Data

US 2023/0208943 A1 Jun. 29, 2023

Related U.S. Application Data

(63) Continuation of application No. 17/222,221, filed on Apr. 5, 2021, now Pat. No. 11,601,529, which is a
(Continued)

(51) Int. Cl.
*H04L 69/08* (2022.01)
*G06F 8/20* (2018.01)
(Continued)

(52) U.S. Cl.
CPC ............... *H04L 69/08* (2013.01); *G06F 8/20* (2013.01); *G06F 8/60* (2013.01); *G06F 8/70* (2013.01); *G06F 11/3604* (2013.01); *G06Q 10/067* (2013.01); *H04L 67/56* (2022.05); *G06F 3/04817* (2013.01); *G06F 3/0484* (2013.01);
(Continued)

(58) Field of Classification Search
CPC ....... H04L 69/08; H04L 67/56; H04L 67/306; H04L 67/02; H04L 67/10; H04L 67/125; G06F 8/20; G06F 8/60; G06F 8/70; G06F 11/3604
See application file for complete search history.

(56) References Cited

U.S. PATENT DOCUMENTS 5,640,501 A 6/1997 Turpin
6,314,415 B1 11/2001 Mukherjee
(Continued)

OTHER PUBLICATIONS

Office Action for U.S. Appl. No. 17/750,554, dated Apr. 25, 2023, VanAntwerp, "Method and System for Generating Dynamic User Experience Applications", 21 pages.
(Continued)

*Primary Examiner* — Benjamin M Thieu
(74) *Attorney, Agent, or Firm* — Lee & Hayes, P.C.

(57) ABSTRACT

A method of generating generic protocol handlers includes receiving a user request in a middleware, generating a request payload by analyzing the request in a protocol handler of the middleware, transforming the request payload into a set of canonical types, transmitting the set of canonical types to a path module, receiving a response payload, transforming the response payload in a second protocol handler of the middleware, and transmitting the response to the user.

20 Claims, 5 Drawing Sheets

Related U.S. Application Data continuation of application No. 16/001,643, filed on Jun. 6, 2018, now Pat. No. 10,979,539.

(60) Provisional application No. 62/535,613, filed on Jul. 21, 2017.

(51) Int. Cl.

| | | |
|---|---|---|
| *G06F 8/60* | (2018.01) | |
| *G06F 8/70* | (2018.01) | |
| *G06F 11/36* | (2006.01) | |
| *G06Q 10/067* | (2023.01) | |
| *H04L 67/56* | (2022.01) | |
| *G06F 3/04817* | (2022.01) | |
| *G06F 3/0484* | (2022.01) | |
| *G06F 8/10* | (2018.01) | |
| *G06F 8/38* | (2018.01) | |
| *G06F 9/50* | (2006.01) | |
| *G06Q 10/0633* | (2023.01) | |
| *G06Q 40/12* | (2023.01) | |
| *H04L 67/306* | (2022.01) | |
| *H04L 67/50* | (2022.01) | |

(52) U.S. Cl.
CPC .............. *G06F 8/10* (2013.01); *G06F 8/38* (2013.01); *G06F 9/5038* (2013.01); *G06Q 10/0633* (2013.01); *G06Q 40/123* (2013.12); *H04L 67/306* (2013.01); *H04L 67/535* (2022.05)

(56) References Cited

U.S. PATENT DOCUMENTS

| | | |
|---|---|---|
| 7,752,092 B1 | 7/2010 | Mattice et al. |
| 7,818,341 B2 | 10/2010 | Kurien et al. |
| 8,533,584 B2 | 9/2013 | Dittmar et al. |
| 9,086,914 B2 | 7/2015 | Bolohan et al. |
| 11,069,001 B1 | 7/2021 | Mascaro et al. |
| 2002/0161911 A1 | 10/2002 | Pinckney, III et al. |
| 2004/0015578 A1 | 1/2004 | Karakashian et al. |
| 2004/0163037 A1 | 8/2004 | Friedman et al. |
| 2004/0230636 A1 | 11/2004 | Masuoka et al. |
| 2006/0005140 A1 | 1/2006 | Crew et al. |
| 2006/0069605 A1 | 3/2006 | Hatoun |
| 2006/0074735 A1 | 4/2006 | Shukla et al. |
| 2006/0161272 A1 | 7/2006 | Haller et al. |
| 2007/0271521 A1 | 11/2007 | Harriger et al. |
| 2008/0077530 A1 | 3/2008 | Banas et al. |
| 2008/0154935 A1 | 6/2008 | Draeger et al. |
| 2011/0004590 A1 | 1/2011 | Lilley et al. |
| 2011/0282941 A1 | 11/2011 | Chan et al. |
| 2012/0303756 A1 | 11/2012 | Bolohan et al. |
| 2013/0036367 A1 | 2/2013 | DeRoos et al. |
| 2013/0152001 A1 | 6/2013 | Lovitt et al. |
| 2013/0158964 A1 | 6/2013 | Hall et al. |
| 2013/0159228 A1 | 6/2013 | Meijer et al. |
| 2013/0173719 A1 | 7/2013 | Ahmed et al. |
| 2014/0047028 A1 | 2/2014 | Buth |
| 2014/0122497 A1 | 5/2014 | Eigner et al. |
| 2014/0229898 A1 | 8/2014 | Terwedo |
| 2015/0074615 A1 | 3/2015 | Han et al. |
| 2016/0147729 A1 | 5/2016 | Sivertson et al. |
| 2016/0147828 A1 | 5/2016 | Yu et al. |
| 2016/0259534 A1 | 9/2016 | Simons et al. |
| 2016/0275627 A1 | 9/2016 | Wang et al. |
| 2016/0283889 A1 | 9/2016 | Shukla et al. |
| 2017/0039046 A1 | 2/2017 | Henke et al. |
| 2017/0132200 A1 | 5/2017 | Noland et al. |
| 2017/0161855 A1 | 6/2017 | Schreyer |
| 2017/0220963 A1 | 8/2017 | Canaran et al. |
| 2017/0264566 A1 | 9/2017 | Namboodiri et al. |
| 2017/0315782 A1 | 11/2017 | Chaudhry et al. |
| 2017/0315789 A1 | 11/2017 | Lam et al. |
| 2017/0316363 A1 | 11/2017 | Siciliano et al. |
| 2017/0322782 A1 | 11/2017 | Pakiman et al. |
| 2017/0344895 A1 | 11/2017 | Roy |
| 2017/0357627 A1 | 12/2017 | Peterson et al. |
| 2018/0108093 A1 | 4/2018 | Podgorny et al. |
| 2018/0210619 A1 | 7/2018 | Mowatt et al. |
| 2018/0365025 A1 | 12/2018 | Almecija et al. |
| 2019/0355351 A1 | 11/2019 | Kim et al. |
| 2022/0286531 A1 | 9/2022 | VanAntwerp et al. |
| 2023/0141866 A1 | 5/2023 | VanAntwerp |

OTHER PUBLICATIONS

Herbst, et al., "Integrating Machine Learning and Workflow Management to Support Acquisition and Adaption of Workflow Models", retrieved Dec. 2021, at <<https://onlinelibrary.wiley.com/doi/pdf>>, 2000, pp. 67-92.

Office Action for U.S. Appl. No. 16/001,629, dated Jul. 9, 2021, VanAntwerp, "Method and System for Reconciling User Interactions ", 14 pages.

Final Office Action dated Jul. 23, 2020 for U.S. Appl. No. 16/001,629, "Method and System for Reconciling User Interactions", VanAntwerp, 9 pages.

Final Office Action dated Aug. 6, 2020 for U.S. Appl. No. 16/001,571, "Method and System for Administering Dynamic User Experience Applications", VanAntwerp, 20 pages.

Office Action for U.S. Appl. No. 16/001,602, dated Sep. 2, 2021, VanAntwerp, "Method and System for Optimizing Dynamic User Experience Applications", 25 pages.

Non Final Office Action dated Jan. 24, 2020 for U.S. Appl. No. 16/001,571 "Method and System for Administering Dynamic User Experience Applications" VanAntwerp, 9 pages.

Office Action for U.S. Appl. No. 16/001,571, dated Jan. 3, 2023, VanAntwerp, "Method and System for Administering Dynamic User Experience Applications", 12 pages.

Office Action for U.S. Appl. No. 16/001,629, dated Jan. 3, 2023, VanAntwerp, "Method and System for Reconciling User Interactions ", 11 pages.

Office Action dated Jan. 7, 2021 for U.S. Appl. No. 16/001,629, "Method and System for Reconciling User Interactions", VanAntwerp, 9 pages.

Office Action for U.S. Appl. No. 16/001,571, dated Dec. 21, 2021, VanAntwerp, "Method and System for Administering Dynamic User Experience Applications", 12 pages.

Office Action for U.S. Appl. No. 16/001,629, dated Dec. 21, 2021, VanAntwerp, "Method and System for Reconciling User Interactions" 14 pages.

Office Action dated Feb. 22, 2021 for U.S. Appl. No. 16/001,571, "Method and System for Administering Dynamic User Experience Applications", VanAntwerp, 11pages.

Office Action dated Mar. 2, 2021 for U.S. Appl. No. 16/001,602 "Method and System for Optimizing Dynamic User Experience Applications" VanAntwerp, 20 pages.

Final Office Action dated Mar. 4, 2020 for U.S. Appl. No. 16/001,602 "Method and System for Optimizing Dynamic User Experience Applications" VanAntwerp, 19 pages.

Office action for U.S. Appl. No. 16/001,629, dated Apr. 3, 2020, VanAntwerp, "Method and System for Reconciling User Interactions ", 8 pages.

Non Final Office Action dated May 29, 2020 for U.S. Appl. No. 16/001,643 "Method and System of Generating Generic Protocol Handlers" VanAntwerp, 12 pages.

Office Action for U.S. Appl. No. 17/222,221, dated Jun. 30, 2022, VanAntwerp, "Method and System of Generating Generic Protocol Handlers", 6 pages.

Office Action for U.S. Appl. No. 16/001,571, dated Jul. 21, 2022, VanAntwerp, "Method and System for Administering Dynamic User Experience Applications", 13 pages.

Office Action for U.S. Appl. No. 16/001,629, dated Jul. 21, 2022, VanAntwerp, "Method and System for Reconciling User Interactions", 14 pages.

(56) References Cited

OTHER PUBLICATIONS

Office Action for U.S. Appl. No. 16/001,571, dated Aug. 31, 2021, Kalmes, "Method and System for Administering Dynamic User Experience Applications", 11 pages.
Schaffer, "Common SMS Problems and How to Solve Them, Part 1", Twillo Cloud Blog, available at <<https://www.twilio.com/blog/2015/08/common-sms-problems-and-how-to-solve-them-part-1.html>>, Aug. 21, 2015, 7 pages.
Machulak, et al., "User-Managed Access to Web Resources", retrieved Aug. 1, 2023, at <<https://dl.acm.org/doi/pdf/10.1145/1866855.1866855>>, 2010, pp. 35-44.
Office Action for U.S. Appl. No. 16/001,629, dated Aug. 4, 2023, John M. VanAntwerp, "Method and System for Reconciling User Interactions", 13 pages.
Office Action for U.S. Appl. No. 18/094,882, dated Sep. 29, 2023, John M. VanAntwerp, "Method and System for Optimizing Dynamic User Experience Applications", 34 pages.
Office Action for U.S. Appl. No. 16/001,571, dated Aug. 2, 2023, John M. VanAntwerp, "Method and System for Administering Dynamic User Experience Applications", 15 pages.

METHOD AND SYSTEM OF GENERATING GENERIC PROTOCOL HANDLERS

CROSS-REFERENCE TO RELATED APPLICATION

The present application is a continuation of, and claims priority to, U.S. application Ser. No. 17/222,221, filed Apr. 5, 2021, which is a continuation of, and claims priority to, U.S. application Ser. No. 16/001,643, filed Jun. 6, 2018, now U.S. Pat. No. 10,979,539, issued on Apr. 13, 2021, which is a nonprovisional of, and claims priority to, U.S. Provisional Application No. 62/535,613, filed Jul. 21, 2017. The entire disclosures of the applications noted above are hereby expressly incorporated herein by reference.

TECHNICAL FIELD

The present invention generally relates to systems and methods for generating generic protocol handlers, in particular, for translating, formatting, and processing information.

BACKGROUND

Software applications are becoming more pervasive. For example, in the Internet of Things (IoT), software applications are commonly being provided in cellular phones, televisions, wrist watches, household appliances, etc. Each of the applications in these devices may "speak" one or more of a plurality of application protocols, such as Hypertext Transfer Protocol (HTTP), HTTP over Transport Layer Security (HTTPS), interactive voice response (IVR), short message service (SMS), simple mail transfer protocol (SMTP), etc. Within each application protocol, data may be encoded in one or more sub-protocols. For example, in HTTP/S, common sub-protocols/data formats may include representational state transfer (REST), simple object access protocol (SOAP), JavaScript Object Notation (JSON), etc.

Software applications are also increasing in number. For example, some software applications may be implemented as dynamic user experience (UX) applications. Because dynamic UX applications comprising complex user interface behaviors and customizations may be easily and quickly created, the number of applications in existence may outstrip an organization's ability to create middleware to handle the volume of requests generated by the dynamic UX applications.

The proliferation of protocols and sub-protocols and the increase in the number of dynamic UX applications causes great complexity in large software systems. To craft a new application, a software developer must write code to individually manage all of the possible protocols and sub-protocols with respect to the application, and must do so at an unsustainable pace. What is needed are methods and systems for generating generic protocol handlers for exchanging data in a common format, based on converting requests to canonical data types.

BRIEF SUMMARY

In one aspect, a method for generating generic protocol handlers includes processing user requests and responses by a middleware by receiving a request, analyzing the request using a first protocol handler included in the middleware to generate a request payload, transforming the request payload into a set of canonical types, and transmitting the set of canonical types to a path module. The method may further include receiving a response payload from the path module, wherein the response payload is associated with at least one of the set of canonical types, analyzing the response payload using a second protocol handler to generate a response, and transmitting the response to a second computing system.

In another aspect a computing system including one or more processors and one or more memories storing instructions is provided. When the instructions are executed by the one or more processors, they cause the computing system to receive a request, analyze the request using a first protocol handler to generate a request payload, transform the request payload into a set of canonical types, transmit the set of canonical types to a path module, and receive a response payload from the path module, wherein the response payload is associated with at least one of the set of canonical types. The instructions may also cause the computing system to transform the response payload using a second protocol handler to generate a response, and to transmit the response to a second computing system.

BRIEF DESCRIPTION OF THE FIGURES

The figures described below depict various aspects of the system and methods disclosed herein. It should be understood that each figure depicts an embodiment of a particular aspect of the disclosed system and methods, and that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

I. Overview

Figure 1:
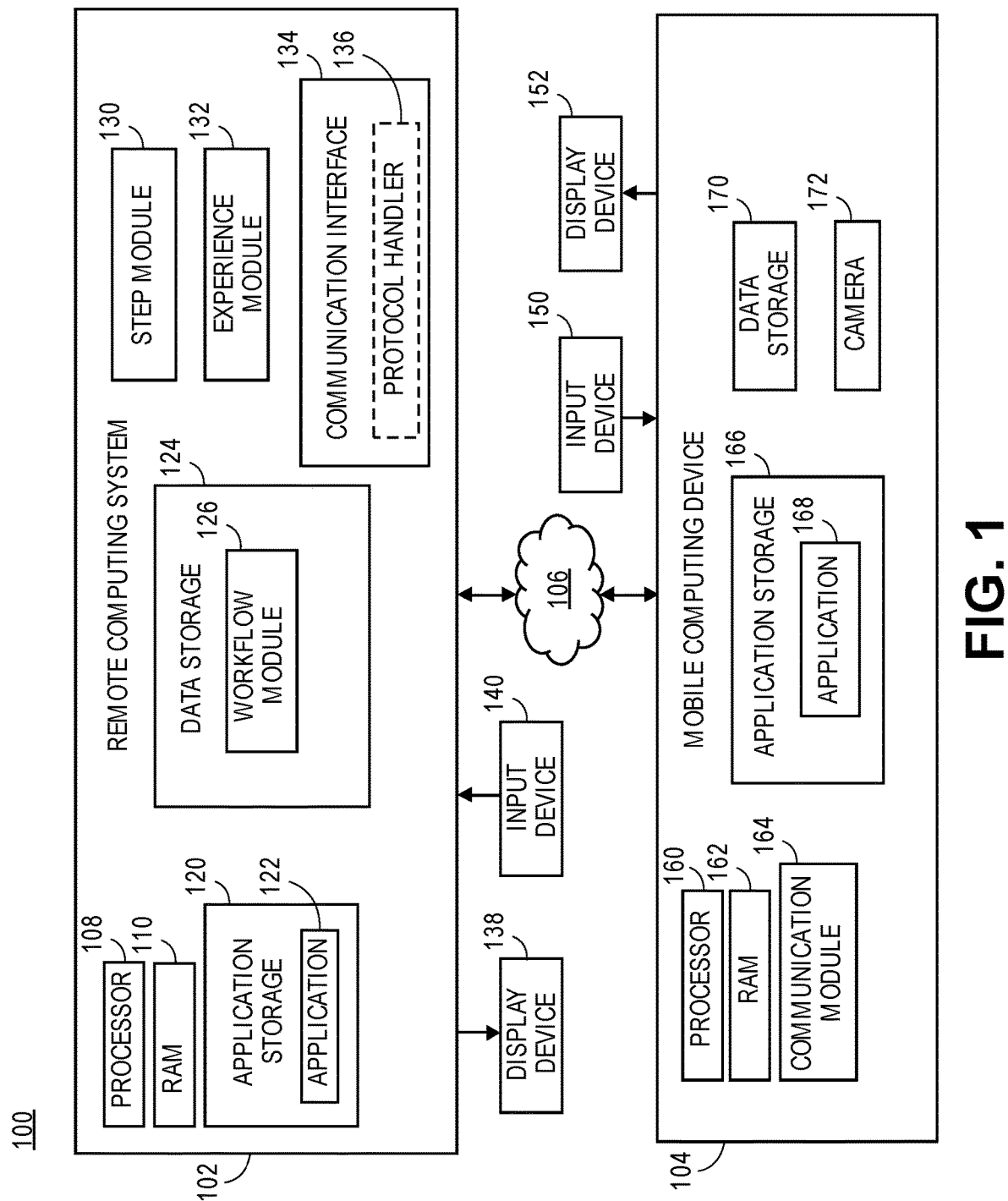
FIG. 1 depicts an environment in which one or more protocol handlers may process requests, according to an embodiment.

The embodiments described herein relate to, inter alia, methods and systems for generating generic protocol handlers. More specifically, in some embodiments, a client application is provided to a mobile computing device (e.g., a laptop, server, smartphone, wearable device, etc.) of a user. One or more protocol handlers may process, analyze, translate, and/or route requests from the client application to perform a plurality of functions, including accessing existing dynamic user experience (UX) applications, and constructing new dynamic UX applications. The client application may cause the mobile computing device to access a remote computing device (e.g., a server), and may transmit instructions or messages to the remote computing device which cause a path management application, or workflow manager application, along with associated steps, to be created, modified, and/or stored in the remote computing device. Herein, the terms "path" and "workflow" may be used interchangeably. The path management application may create and/or modify canonical resources on the remote computing device, and may cause the canonical resources to be associated with the paths and/steps. The steps may define information necessary to accomplish a business goal, and the paths and/or steps may be associated with rules or other modules which may determine how the steps are displayed in the mobile computing device.

As used herein, the term "workflow" or "path" may refer, generally, to a portion of a business process that may require human interaction. For example, "collect user personal information" may be the business process corresponding to a step. Human interaction may include collection of data, approval of information presented to the user, etc. A business process may comprise one or more workflows, and workflows may be reused and shared among business processes. The reusability of workflows and steps is a primary benefit of the methods and systems described herein. Workflows and steps may be reused across organizations that do not share common owners to build a consistent user experience. For example, a workflow may be used by two corporations A and B, wherein A and B have no common shareholders. Workflows may be deployed in applications, in production and/or development environments. A workflow, or path, may comprise state information and/or metadata. For example, each workflow may include a current step pointer, which corresponds to the step within the workflow that the user is in the process of completing. A ratio of the number of steps that the user has completed to the total number of steps within a workflow may be computed by a workflow manager. A report may be obtained from the workflow manager specifying which steps are complete and the respective completion state of each one. Workflows may maintain step references, rules governing workflow version adoption, and workflow auditing requirements. Each step reference may refer to a step and upstream dependencies of a step. Each step reference may connect available step canonical properties to the business step parameters for a workflow. The information specified by the step reference may be used by a workflow manager to notify an experience manager to notify properties, and which properties should be discovered. Each step in the workflow may be associated with a step reference that represents the step. Workflow state may be captured in records known as interactions which may be associated with users. For example, state information with respect to a user's use of a credit card application workflow may be encapsulated into an interaction. In some embodiments, a workflow, path, and steps may be implemented in a canonical data format (i.e., a data format that is shared among, and common to, all objects).

Paths, or workflows, may be executable (e.g., by a client application and/or server application) and may comprise a series of executable steps. Steps within a workflow may be ordered by the sequence in which they are presented to the user, and may repeat (e.g., in a workflow execution loop). Steps may be shared between workflows to allow for modularity and creation of new workflows from existing steps. Workflow steps may obtain the information necessary to execute their business rules from business capability services (e.g., from APIs which provide information) or other locations (e.g., from a user). Steps may contain, or cache, data internally that may be necessary for their respective execution. Steps may be externalized (i.e., run in an external rule engine). Steps may be executed in parallel for performance reasons, and may be executed in multi-pass, and/or recursively. The execution time of steps may be tracked and traced for profiling or other purposes. Steps may or may not be individually secured components; therefore, the decision of whether or not a user is authorized to access a step may be made by a component separate from a step. Workflows and steps may be executed based on user roles—for example, a workflow may be executed differently depending on whether the accessing user is an agent, customer, or a customer service representative.

Steps may be reusable building blocks (e.g., "register a customer"). Generally workflows correspond to business processes, (e.g., "credit card application") and steps may encapsulate business rules which form part of the workflow (e.g., "collect applicant's home address"). A step may be an individual executable component of a path. Each step may maintain properties required for its execution and its current internal state. A step may be associated with a step type. Types of steps may include active state, address standardization, always complete, basic info, and others. In practice, steps may be implemented in any suitable manner (e.g., as Java classes deployed in a Jar file within an application). Steps may include or be associated with step parameters that may be linked to one or more canonical types, which may respectively correspond to the inputs accepted (and in some embodiments, required) by the steps. "Canonical type" as used herein may refer to a tuple including both a value and its data type, wherein the data type may be a complex value. For example, a canonical type may be (TelephoneNumber, 555-123-4567) or (Account, <User.Account>), wherein Account refers to an object-oriented class type, and User.Account refers to an instantiated electronic object of that class.

In some embodiments, steps may include prerequisites. For example, a step in which a user submits a credit card application may not be able to be completed by a user until one or more prerequisite steps are completed. This order completion requirement may be enforced by a workflow, a step, and/or a workflow runtime (e.g., a workflow manager). Similarly, some steps may be optional, in that a user may not be required to complete them to proceed to a next step. For example, a workflow may comprise an optional "cross sell" step in which the workflow presents a user with an offer to purchase a related product, but the user's decision to reject, or not accept, the offer may not affect the user's ability to progress to the next step. The optionality and prerequisite nature of steps may be defined in workflow metadata. In this way, a given step may be optional in one workflow, but not another. In yet another embodiment, an optional step may become a required step based on information entered by the user. For example, entering information about the user's real property holdings may be optional, unless and until the user declines to enter information about the user's savings accounts. The business logic for implementing optional steps that become required may be stored within the step, according to an embodiment.

In yet another embodiment, a workflow may be used by an intake facility to digitize paper records. For example, information from a customer received via phone, agent office, mobile, and postal mail may be manually input into an appropriate workflow. The customer may then be sent a link to the workflow, and may resume working on an application with the information manually input pre-populated and available for the customer's inspection/verification. Manual input may also be used for the purposes of entering data into underwriting systems. In some embodiments, a user may switch between multiple input devices and/or protocols (e.g., from a cellular telephone to a voice-activated system) while remaining within the same workflow, and/or while interacting with the same step.

Steps and workflows may be comprised of one or more data structures encoded in a common format. Such common formats may include, without limitation, JavaScript Object JSON and Extensible Markup Language (XML). JSON and XML may be used by protocol handlers to allow data structures created in a server to be copied identically to a client, and vice versa. In other embodiments, the common format may include plain text which one or more protocol handlers may convert to one or more canonical types.

II. Example Environment for Processing Requests by a Protocol Handler

With respect to FIG. 1, an example environment 100 in which dynamic user experiences may be administered is depicted, according to an embodiment. Environment 100 may include various client-side and server-side components; specifically, environment 100 may include a remote computing system 102 (equivalently, "server 102", or "server device 102") which may be coupled to a mobile computing device 104 (equivalently, "client 104", or "client device 104") via a network 106.

Server 102 may be a single server or a group of multiple servers and multiple servers 102 may be deployed wherein each may be representative of a business API or service. Using multiple servers 102 may provide a number of benefits, including isolation between business APIs, isolation of production and testing environments, and greater availability and stability to each respective business API. Using multiple servers 102 may also provide the ability to independently tune and scale each business API, the opportunity to expose a more traditional API on a per-service basis, and may provide a business specific endpoint. Multiple servers 102 may provide tools and metrics that can be more easily aligned to business processes, and may provide each business API with the ability to be independently versioned giving consumers greater control over adoption and funding.

Alternatively, or in addition, server device 102 may be a multi-tenant device, wherein multiple business APIs may be implemented in a platform-as-a-service (PaaS) model. Advantages of implementing dynamic UX applications as PaaS may include more seamless sharing of resources between business APIs, quicker implementation of changes for multiple APIs (i.e., all instances may be changed simultaneously), and quick implementation of changes to shared resources between business APIs (e.g., business rules, common services, reusable workflow steps, etc.).

Server device 102 may include a processor 108, RAM 110, application storage 120 (e.g., one or more persistent memories), and application 122, which may include software instructions (e.g., a web stack, Android package, etc.). While referred to in the singular, processor 108 may include any suitable number of processors of one or more types (e.g., one or more central processing units (CPUs), graphics processing units (GPUs), etc.). Generally, processor 108 may be configured to execute software instructions stored in one or more memories (e.g., stored in a persistent memory such as a hard drive or solid state memory) of server device 102. RAM 110 may comprise solid state and/or transient memory and may store application storage 120, including instructions (e.g., corresponding to application 122). When processor 108 executes instructions corresponding to application 122, RAM 110 may, for example, temporarily store the instructions and data required for execution of application 122. Processor 108 may load instructions stored in application storage 120 or any other location into RAM 110. Software instructions, when executed by processor 108, may generate, create, and/or execute one or more dynamic UX applications, which may be loaded into RAM 110 or application storage 120.

Generally, server device 102 generates dynamic UX applications which may be accessed/utilized by client device 104, and processes user requests to create, edit, delete, or update existing dynamic UX applications and components thereof. Portions of the dynamic UX applications generated by server device 102 may be displayed on client device 104 (e.g., by application 168 and display 152).

In some embodiments, application 122 may be part of a larger application or set of applications. Application 122 may provide code and data (e.g., a dynamic UX application) to client devices. Code and data may include a fully-formed dynamic UX application, or requests used to construct, modify, and/or view a dynamic UX application or portions of a dynamic UX application displayed in a client device. For example, server device 102 may generate web pages (e.g., Hypertext Markup Language (HTML) instructions, JavaScript instructions, Java Server Pages (JSP) instructions, mobile device application, and/or any other type of instructions suitable for defining the content and presentation of the code and data), and/or may include instructions of a plug-in, extension, and/or stand-alone software component that may be downloaded by client device 104.

Generally server device 102 may provide users accessing application 122 with one or more user interfaces which may enable the users to interact with application 122, and which in turn, may modify data associated with server 102. To that end, server device 102 may transmit user interface (UI) components (e.g., style sheets, executable code, HTML or JavaScript widgets, etc.) to clients, which the clients may execute, and with which the respective users of those clients may interact. Those clients may transmit data back to server device 102 in the form of requests, which may include data payloads.

Server 102 may also include data storage 124, workflow module 126, step module 130, and experience module 132. Server 102 may also include a communication interface 134 and a protocol handler 136, which, respectively, cause information to be transmitted to and from devices (including server 102) via network 106; and perform operations (translation, formatting, processing, etc.) on that information. The precise arrangement of the foregoing components may differ from that depicted in FIG. 1. For example, in some embodiments, step module 130 may be contained within data storage 124, or may reside in a separate server. In some embodiments, experience module 132 may be included in another server, in some embodiments, and an API may link experience module 132 to modules of server 102.

Data storage 124 may be composed of any suitable persistent or transient memory (e.g., a hard drive, random-access memory unit, etc.), and may store any number of modules including, without limitation, those depicted in FIG. 1. Data storage may include an electronic database (e.g. a relational database, key-value store, flat file, etc.) in which electronic records representing paths and steps may be stored, and associated. For example, a path may be stored in a one-to-one, one-to-many, or many-to-many relationship with one or more steps. A step may be stored in a similar relationship with respect to one or more canonical types. A user may configure and modify the respective relationships between workflows, steps, and canonical types using the methods and systems described herein.

Workflow module 126 may receive requests, in response to which application 122 may take actions and issue responses. For example, workflow module 126 may advance the current step pointer from one step to another, for example, if workflow module 126 determines based on an analysis of the request that a step has been successfully completed. Workflow module 126 may communicate information to experience module 132. Similarly, workflow module 126 may terminate a given workflow, add a step to a path, create a path, associate one or more canonical types with a step, evaluate a step, etc. based on a respective instruction from application 122.

Generally, workflow module 126 may contain instructions for managing workflows, or paths. Workflow module 126 may include workflow metadata, such as a name, creation date and time, and unique identifier associated with each workflow. Workflow metadata may also include a list of steps associated with each respective workflow. Workflow module 126 may be communicatively coupled to a data store (e.g., an electronic database) in which workflows and steps are stored. Generally, step module 130 contains steps and instructions for executing steps. Step module 130 may include step metadata, such as a name, creation date and time, and unique identifier associated with the each step. Step metadata may include a list of workflows associated with, or which include, each respective step. Step module 130 may include, for each step therein, a list of inputs, and associated canonical types associated with each respective input.

Workflow module 126 may contain one or more workflows and may manage the execution of the workflows. Workflow module 126 may include a table of all workflows indexed by user or session, and their respective states. Workflow manager 126 may include a step with multiple resource types and steps may be executed as part of a workflow or individually. Steps may be associated with a user interface (e.g., a web form) and may log system activities (e.g., an audit log or information journal). Logging information may include debugging information (e.g., originating business context, etc.).

In general, any component may log information. For example, a user may be presented with a form that is part of a step by a client application, and may enter information into, and submit the form. Completion of the step may require the user to enter data that the client may transmit via the application. The step may process the form and, optionally, make an entry in an audit system for audit purposes. In some embodiments, a step may process its input in a client (e.g., client 104). The same form may be re-used in case a user edits or verifies information displayed in a form. Then, the data the user entered previously may be sent to the step, which may pre-populate the form. However, in this case, the step may not be re-executed if the information has not changed (i.e., if the user does not change the information). Similarly, an audit entry may not be made if the step does not re-execute. Workflows and steps may both create audit records that may include a business context (e.g., the name of a referring agent). Workflow module 126 may determine the readiness of a step for execution in response to any new information workflow manager 126 receives.

While executing/processing a particular step, workflow module 126 may launch an external application. Workflow manager 126 may return the user to the executing step when the external application closes. For example, an application may receive a step generated by workflow module 126 that launches a PDF document in a PDF reader. Other examples may include launching external applications for electronic signatures, supporting documents, and customer searches. After reviewing the PDF document, the user may close the PDF reader and the application 168 may continue executing. In an embodiment, execution of the external program may not block execution of workflow module 126 (i.e., execution of external programs may be asynchronous with respect to the execution of workflow module 126). In an embodiment, workflow module 126 may support an event-based architecture, and may provide real-time notification of events to users. In some embodiments, the workflow module 126 may prevent step information from being stored, either temporarily or permanently.

Experience module 132 may be a module that generates user experiences dynamically based on individualized UX rules defined by backend users, or generated according to an algorithm. For example, a user of an application may be presented with a different experience based on information known about the user and/or the user's activity within the application. Experience module 132 may seek to understand the customer and personalize their digital interactions with application 122 in much the same way that humans personalize human interactions with the same customers. To accomplish this, experience module 132 may fit the experience to the individual customer, determining how and when to display content based on user preference. Determining how and when to display content may be based on a runtime determination of information associated with the user or a session associated with the user. Experience module 132 may create the user experience once, in the case of a standalone application 168 delivered to a user, or may do so on a continuous/on-demand basis for applications in a server (e.g., application 122). Experience module 132 may be implemented using a suitable application framework (e.g., Ember.js).

Experience module 132 may create UX flows and request information from the user, and may send messages in canonical request format to protocol handler 136, which may in turn generate responses and send the responses to client 104. Experience module 132 may receive an indication of information source which indicates whether the information was directly entered by the user, discovered by a company service/source, retrieved from an external source (e.g., a vendor), or calculated (e.g., created by a business step). Based on the information source, experience module 132 may adjust the UX displayed to the user accordingly by, for example, presenting the user with an indication that the information was automatically populated, and encouraging the user to double-check or confirm the information. Such indications may take any suitable form (e.g., a textual message, the addition of color, the reordering of information in a table, etc.).

Experience module 132 may use information received from workflow module 126 to make UX flow decisions and to avoid problems (e.g., deadlocks). In an embodiment, experience module 132 may receive the number of steps that are remaining in workflow module 126, which have not yet been executed, and an indication of what the steps are. Experience module 132 may then determine whether to delay asking the user for information. For example, in some embodiments, another component (e.g., workflow module 126) may be unable to proceed without the information that experience module 132 wants to delay.

Experience module 132 may translate requests for further information from the user made by workflow module 126 into an experience designed by experience architects. In an embodiment, behaviors and UX events may be stored within an interaction, wherein the interaction holds information about actions the user takes within the UI which can be used by experience module 132 to make decisions about which experience to deliver to the user in a given circumstance. Any user accessing application 122 may be provided with a different, or personalized, UX based on captured UX events, and other information. For example, experience module 132 may query another module for information which may be used to create a UX. Experience module 132 may learn another module that a particular user prefers a dark background in application A. Experience module 132 may then change the UX delivered to the user (e.g., a web application, standalone application, etc.) in application B to include a dark background. Experience module 132 may be associated with a content delivery network (CDN), UX rules database, and with one or more system of interaction electronic databases. Workflow module 126 may present the user with a UX that is obtained, in whole or in part, from experience module 132. For example, experience module 132 may comprise an intelligent agent which assists users in selecting auto insurance coverage. The selection of UI/UX components may be based on information experience module 132 may access regarding the workflow and user. The intelligent agent may prompt a first user to select coverage from a drop-down menu. The intelligent agent may prompt a second user to select coverage by manipulating a slider UI control. The choices of information may be the same or differ, but the presentation to the user may be personalized. The personalization (e.g., drop-down or slider) may depend on interactions that the first and second users have had previously with experience module 132. For example, a user may have responded more favorably to one UI control than another.

In an embodiment, experience module 132 may include instructions that make UX decisions based on information needed by workflow module 126. For example, if only one step remains in a path, experience module 132 may provide an indication to user that the workflow is "almost complete!". A color or other visual indication may be used to denote that the path is nearing completion. In some cases, experience module 132 may adjust components used in the UI based on the confidence level of information collected. For example, if a user provides a telephone number that contains letters, then experience module 132 may show a UI control accentuated to designate the input as possibly invalid or suspect. Experience module 132 may make UX decisions based on the number of steps that are available for execution. For example, experience module 132 may display a different UI arrangement for a workflow comprising 25 steps than one that only contains two steps. For example, in the later example, the UX may consist of a single page, whereas in the former example, two or more pages may be used.

According to an embodiment, experience module 132 may use information collected during research to present an UX that is likely to cause users to complete workflows. Information collected during research may include, for example, user survey data, user facial analysis data, or other information regarding operation of one or more applications via one or more users. For example, research may indicate that a significant amount of potential customers halt their progress through an auto quote workflow when asked, early on in the workflow, for their social security number or other personal data. Experience module 132 may use this sort of finding to determine an optimal time to present or ask for a social security data (e.g., via a particular user interface) while another module returns data that may be useful in completing the quote as far as possible before the social security data may be needed. Additionally or alternatively, experience module 132 may determine an optimal manner of presenting or requesting particular information (e.g., whether to request/receive social security data via a visual data entry field, or via audio input/output). Although some of the foregoing examples involve varying UI controls within UX (such as sliders and dropdowns), other aspects of UX may also be varied. For example, the language of messages to the user may be changed, including slang and affectation, depending on user feedback.

Protocol handler 136 may receive requests from clients. Protocol handler 136 may examine requests, determine if each request is associated with a user or session, and if so, whether the user/session corresponds to an existing user/session. Sessions may be stored in a database communicatively coupled to server 102, or client 104. Protocol handler 136 may determine a network protocol and sub-protocol associated with a request, and may route the request to the workflow module 126 or another module, which may cause workflow module 126 to begin executing a workflow at a position (e.g., at a step). In some embodiments, a first protocol handler may determine an application protocol, and a second protocol handler may determine a content type or sub-protocol. The position may be specified by a request, or may be associated with a user/session. In general, requests may be received by protocol handler 136 and responses may be sent by protocol handler 136. As used herein, the term "request" or "response" generally refer to an electronic request object that represents an exchange of information between a user and an application via the network 106. The terms "user request" and "request" may be used interchangeably. Requests and responses may be transferred between server 102 and clients (e.g., client 104) via a common data interchange protocol (e.g. via a representational state transfer (REST) API) or a proprietary data interchange protocol. Requests are generally inbound to the methods and systems, and responses are generally outbound from the methods and systems. However, in some embodiments, requests and responses may be sent to and from a single computing device and/or application.

While some of the examples herein refer specifically to requests and responses pertaining to, for example, credit card and auto insurance applications, it should be appreciated that the techniques described herein are applicable to many other types of applications. For example, a gaming application created for a mobile device may support its own form of user requests and responses. In some embodiments, requests are stateless, and in others, requests may have state. A request may be user-initiated, wherein the request is based on, or generated in response to, a direct or indirect user action. For example, a user of a user device (e.g., server 102 or client 104) may perform a click event on a form submit button using a peripheral device, or may make a selection via a capacitive touch screen, or perform any other suitable action indicating an initiation of a request. Instructions executing in the user device may process the user selection or event and, in response, generate and transmit a request (e.g., via network 106). It should be noted that in some embodiments, the user device and the remote computing system may refer to the same device (e.g., server 102), and that in other embodiments, the user device may be a client device (e.g., client 102) linked to the remote computing system via an intermediate wired and/or wireless network.

A request may include an operation, wherein the operation may include creating, retrieving, updating, and/or deleting one or more paths and/or steps. For example, the user may initiate a "CREATE" operation with respect to a path. To do so, a user may be required to enter path information by, for example, typing or otherwise entering information into a form fieldset. The operation and path information may be included in the request, and may be evaluated by workflow module 126. Evaluating the request may include mapping the operation (e.g., UPDATE) to a corresponding method of one or more of a plurality of electronic database systems, and depending on the request type, evaluating the request may include providing the method with one or more evaluation parameters, which may correspond to information in the request (e.g., a path ID, step ID, user ID, etc.).

More than one protocol handler 136 may be configured, and protocol handler 136 may be integral to a client and/or server in environment 100. As stated, protocol handler 136 may receive a user request in response to behavior and events of a user (e.g., a mouse click or another event). Further, code executing in a client may cause user requests to be sent to server 102, and may receive responses, potentially unbeknownst to the user. Requests may be sent by client 104 synchronously or asynchronously with respect to the execution of code in client 104. As noted, in addition to translating requests between clients and applications, protocol handler 136 may route requests to application 122 components, and may also provide other modules with information pertaining to the capabilities of client devices. If a request type corresponds to a workflow initiation or resumption, then protocol handler 136 may route the request to workflow module 126. Upon receiving a request, workflow module 126 may determine whether to resume an existing interaction or begin a new one based on the request contents. Workflow module 126 may determine whether an interaction already exists by analyzing an indication and/or metadata from client device 104 (e.g., a UUID and/or an HTTP header). If an existing interaction is to be used, then workflow module 126 may retrieve the existing interaction. If a new interaction is to be used, then workflow module 126 may initiate a new interaction. It should be noted that a user may also decide to cancel or terminate a workflow. Also, a step may contain logic that causes a workflow to terminate if a certain condition is met, or if a particular input is provided to the step by a user (e.g., by a user of client 104). In some embodiments requests and responses may be respectively handled and issued by client device 104, either exclusively or in combination with server 102.

Server 102 may also include a display device 138 and an input device 140. Input device(s) 140 may include components that are integral to server 102, and/or exterior components that are communicatively coupled to server 102, to enable server 102 to read/retrieve inputs from the user via input device 140. For example, input device(s) 140 may include a mouse, a keyboard, a trackball device, a microphone, scanner, etc. Display device 138 may also be either integral or external to server 102, and may use any suitable display technology (e.g., LED, OLED, LCD, etc.). In some embodiments, input device(s) 140 and display device 138 are integrated, such as in a touchscreen display. Generally, input device(s) 140 and display device 138 combine to enable a user to interact with user interfaces provided by server 102, for example, user interfaces included in, or provided by, application 122.

Client 104 may be any suitable user device (PC, notebook, laptop, desktop, smart phone, or tablet) and may run any suitable operating system. Client device 104 may include one or more client user interfaces (UIs), which the user may access and interact with (e.g., via any suitable web browser). Client UIs may include software (e.g., a dynamic UX application UI including a UI web application and/or model, a UI control library, etc.) owned or controlled by the company or entity operating server 102, and the client UIs may be served to mobile computing device 104 via network 106 from remote computing system 102 (e.g., over HTTP). The client UIs may be implemented as standalone applications (e.g., as Android application packages (APK)) or as executable web code (e.g., HTML, JavaScript, and CSS). In some embodiments, a client UI may be a hybrid of application package code and executable web code.

While FIG. 1 depicts only a single client device 104, it is understood that multiple different client devices (of different entities and/or users), each similar to client device 104, may be in remote communication with server 102. Further, multiple client devices 104 of different types, which may correspond to different user cohorts, may access server 102. For example, in some embodiments, server 102 may accept requests from clients which, respectively, include backend, or administrative, users. Such users may be employees or agents of the proprietor of the methods and systems described herein, and may use client 104 and the services provided by server 102 for the purpose of defining and administering workflows/paths, steps, canonical types, and other operations (i.e., to create dynamic user experience applications for use by other users) as described above.

In the embodiment of FIG. 1, client device 104 includes an input device 150 and a display device 152. Input device(s) 150 may include components that are integral to client device 104, and/or exterior components that are communicatively coupled to client device 104, to enable client device 104 to accept inputs from the user. For example, input device(s) 150 may include a mouse, a keyboard, a trackball device, a microphone, scanner, etc. Display device 152 may also be either integral or external to client device 104, and may use any suitable display technology (e.g., LED, OLED, LCD, etc.). In some embodiments, input device(s) 150 and display 152 are integrated, such as in a touchscreen display. Generally, input device(s) 150 and display 152 combine to enable a user to interact with user interfaces provided by client device 104, for example, client UIs.

Client device 104 may also include a processor 160, a random-access memory (RAM) 162, a communication module 164, and an application storage 166. Application storage 166 may include application 168. Client device 104 may also include a data storage 170 and a camera 172. Processor 160 may include any suitable number of processors and/or processor types. Processor 160 may include one or more CPUs and one or more graphics processing units (GPUs), for example. Generally, processor 160 may be configured to execute software instructions stored in application storage 166 (e.g., client UIs in application 168).

Application storage 166 may include one or more persistent memories (e.g., a hard drive and/or solid state memory), and store a number of applications including, for example, a web browser application implementing application 168, in an embodiment. Application 168 may be a web application, or an application of a different type, such as a standalone executable, distributed mobile application, etc. Data storage 170 may include one or more persistent memories, and generally stores data used by applications stored in application storage 166. For example, data storage 170 may store local copies of steps or other code/data downloaded from server device 102.

Data stored in application storage 166, application 168, and data storage 170 may be loaded into RAM 162 when processor 160 executes instructions stored in application storage 166. Instructions implementing application 168 may be downloaded to application storage 166, and when processor 160 executes application 168, for example, RAM 162 may temporarily store the instructions and data required for its execution while application 168 displays the dynamic UX application on display 152 or otherwise operates on the dynamic UX application. When the user of application 168 uses application 168 to access server device 102, scripts, applications, and/or other instructions of server device 102 (e.g., instructions associated with workflow module 126 and step module 130) may be stored as local copies in RAM 162. Application 168 may load components and data from remote computing system 102, such as user interface components, and application data, into RAM 162, and may store such components and data locally (e.g., in data storage 170). Data storage 170 may include persistent or transient storage devices, including magnetic and/or solid-state storage devices.

Mobile computing device 104 may transmit user requests to remote computing system 102 via network 106. Requests may include data and metadata indications (e.g., a universally unique identifier (UUID) or other identifier), and may be triggered by a user action (e.g., via a user interaction with input device 150) or by the occurrence of a condition (e.g., code in application 168). A request payload may include an indication of one or more workflows/paths, and or associated steps. A request payload may include a tree data structure, wherein each workflow, or path, is a node comprising a plurality of other nodes and/or leaves (i.e., leaf nodes). A leaf node may be a node with no children, or a node with no back links. A node may represent a path, a step, or a sub-step (e.g., a step that includes additional steps). The entire tree of nodes may be downloaded from server 102, modified in client 104, and then uploaded to server 102. In some embodiments, a tree may be a specific type of tree, such as a binary tree, red-black tree, etc. When a path including steps is evaluated, evaluation may proceed according to a modified breadth-first search or depth-first search algorithm, or another tree-traversal algorithm.

In some embodiments, a client application (e.g., client 168) may modify the state of paths and steps within the overall system. Further, client device 104 may decorate requests with an indication of the type of request. For example, the request may be designated as a business resource request, a user information request, a workflow information request, a behavior and UX event, etc. Communication between client device 104 and server device 102 may be implemented using a secure transfer protocol such as HTTPS.

In operation, a backend user may open application 168 in a web browser or as a standalone application (e.g., in a mobile device, laptop, etc.). The user may be presented with a list of paths and steps, which may be pre-loaded into the application 168, or retrieved via communication module 164, network 106, and communication interface 134. The list of paths and steps may be presented to the user in any suitable format, and may be retrieved by the user submitting a request to a remote computing server, such as server 102. The request submitted by the user may include an indication of one or more paths, and the remote computing system may select a set of active paths and respective associated steps based on the indication of one or more paths. The indication of one or more paths may be a simple list of identifiers corresponding to a path, such as integers, or a more complex indication, such as a nested structure. The set of active steps may be transmitted to a user device, wherein the user device is a client device other than the remote computing server, or wherein the user device is the remote computing server. That is, the user may be using the remote computing server directly by input and display devices directly coupled to the remote computing server, such as via display device 138 and input device 140, or indirectly, via a client device and network, such as mobile computing device 104 and network 106.

In some embodiments, paths may be stored in a tree wherein the nodes of the tree correspond to paths and the leaves of each node represent sub-paths, and wherein each path includes one or more steps that may themselves be arranged in a tree, according to some embodiments. Path and steps information may be presented to the user in display 152 and the user may be able to modify any aspect of the state of the list of paths and steps by interacting with one or more input devices, such as input device 152. Path and steps may be transmitted to the user device as described above in a nested data structure, such as a hash map or any other suitable data structure which allows a hierarchical arrangement of paths with respect to steps to be preserved, and processed/displayed by a client application, such as application 168.

The list, tree, or other arrangement of paths and steps may be modified, by the user adding a new path or step. In doing so, the user may be presented with input fields corresponding to a path title, version, level of authorization, etc. Steps being created may include a similar group of input fields. Steps may also include step logic, or rules, which the user may enter as a group of parameters, operators, and operands. The step logic may be executed at the time that the step is executed, to validate, transform, or process inputs. When the user creates a new step, the application may include a facility for the user to create step rules associated with the step, including a facility for the user to include third party services that the step may call. The user may also specify one or more return values that the step may issue to a code or application executing the step. A step and the step's one or more respective step operators and step operands may be associated together in an electronic database.

The paths and steps list may also be modified by the user modifying an existing path or step. Modifying a path may include the user reorganizing the steps within the path, marking the path as active/inactive, changing an attribute of the path (e.g., the legal ownership with which the path is associated), etc. Steps may also be deleted from a path, duplicated amongst and within paths, and entire paths may be deleted, with or without cascading deletion of steps associated with the path being deleted. The user may also define relationships between steps, such as the hierarchical ordering of steps within a path tree, in some embodiments, or the linear ordering of steps in some other embodiments. The user may define dependencies between steps, in that a step A must be presented to the user, and valid output obtained, before a step B may be presented to the user.

Once the user has configured the paths, steps, and canonical types, the user may select a default user experience with which to associate a path and/or one or more steps within the path. Available user experiences may be published by experience module 132, and may specify both the look and feel, ordering and arrangement, and tone/content of information delivered to users via the execution of steps within a path.

The user may create multiple versions of paths and steps, which may be executed at different times, based on conditional criteria (e.g., the identity of the user, the time of day, randomly, according to a schedule, etc.). The user of the administrative tool making changes to paths and steps may, but need not necessarily, be an employee of the proprietor of the methods and systems described herein. For example, the user may be a business analyst, user experience analyst, technical developer, etc. In some embodiments, technical users may construct steps, and non-technical users may build paths. In some embodiments, paths and steps may include logic preventing information from one business unit from being accessible in another, due to regulatory and or legal/compliance issues.

In some embodiments, multiple administrative user interfaces may exist, wherein a first administrative user interfaces exists for defining steps and workflows that are used to generate dynamic UX applications, and a second administrative user interface exists for managing the user experience that will apply to those defined steps and workflows when they are generated and/or accessed by client devices. It should be appreciated that in some embodiments, the user interface components displayed to users are completely uncoupled from the paths and steps represented by the user interface components, in that a user never specifies whether a particular step will use, for example, a drop-down list in HTML to solicit a user selection. Rather, a user may define a step as requiring a user selection from a list through the administrative user interface application 122, and another component (e.g., experience module 132) may determine the graphical user interface component(s) that will be used to accomplish the collection of the needed information, at the time the step is executed. Not only may the controls be subject to runtime determination by experience module 132, but also the ordering and frequency of information collection may be determined by experience module 132.

Network 106 may provide connectivity between server 102 and client 104, in some embodiments. Network 106 may be a single communication network, or may include multiple communication networks of one or more types (e.g., one or more wired and/or wireless local area networks (LANs), and/or one or more wired and/or wireless wide area networks (WANs) such as the Internet). Server device 102 may be accessible by multiple networks, for example by a company intranet and the Internet. Customers may be granted access to a portion of server device 102 (e.g., a bank credit card application) via the internet, whereas business partners, agents, and employees of the proprietor of server device 102 may be granted broader, or narrower, access to portions of server device 102 (e.g., to a path editor or experience editor). Access to additional services may be similarly granted or restricted by the proprietor of server device 102 on any suitable basis.

Figure 2:
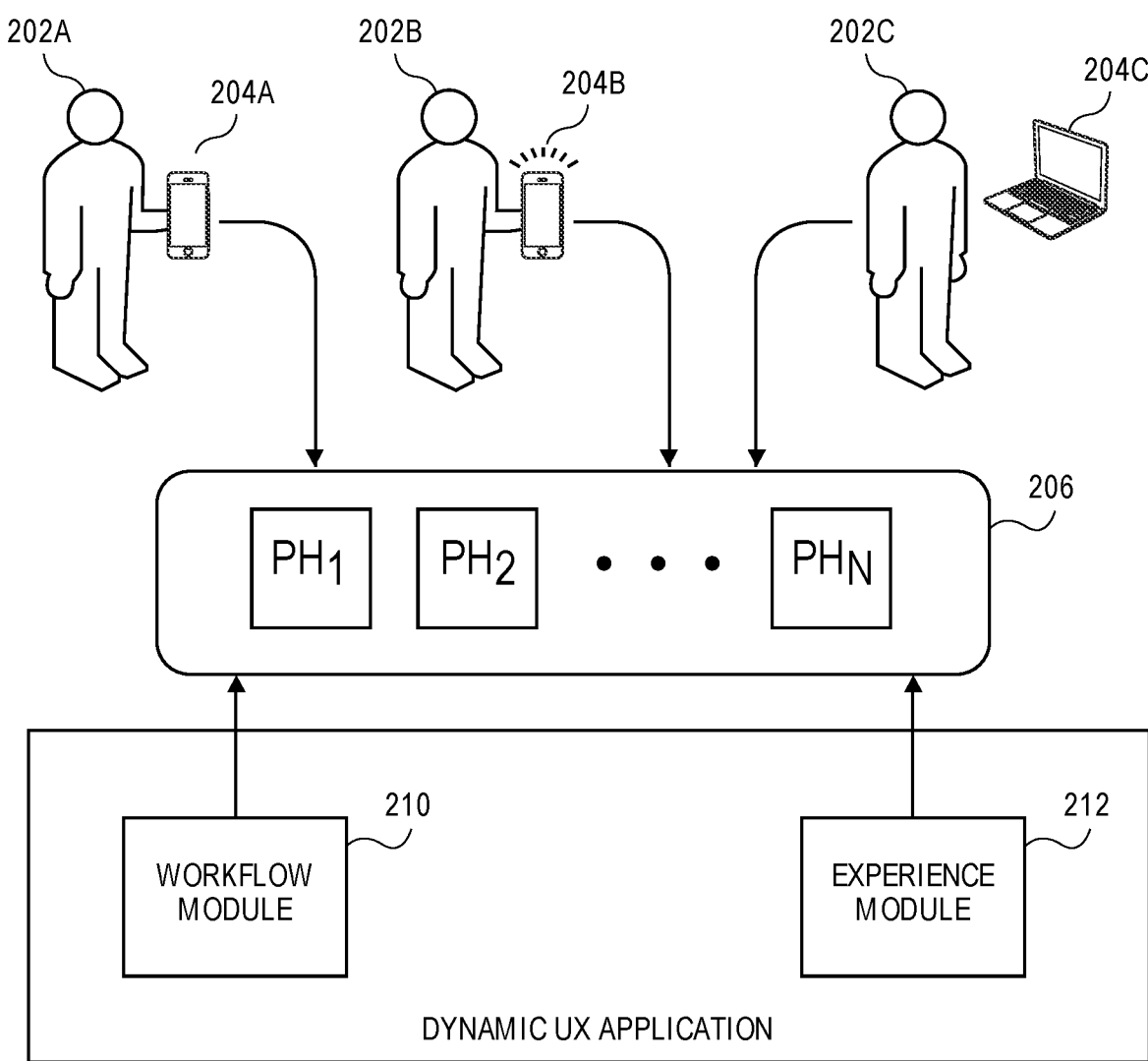
FIG. 2 depicts an exemplary flow diagram for facilitating dynamic user experience applications by processing heterogeneous user requests, according to an embodiment.

III. Example Request Processing in a Protocol Handler to Facilitate Dynamic UX Applications With respect to FIG. 2, an exemplary flow diagram 200 for facilitating dynamic user experience applications by processing heterogeneous user requests is depicted, according to an embodiment. Flow diagram 200 may include users 202A-202C, respective devices 204A-204C, protocol handler middleware 206 comprising individual protocol handlers $PH_1$-$PH_n$, wherein n is any positive integer, and dynamic UX application 208. Dynamic UX application 208 may include several modules, including without limitation, workflow module 210 and experience module 212. Respective devices 204A-204C may correspond, respectively, to mobile computing device 104. However, in some embodiments, one or more of respective devices 204A-204C may be integral to, or identical to, remote computing system 102. Protocol handler middleware 206 may correspond to communication interface 134, and each of individual protocol handlers $PH_1$-$PH_n$ may correspond to protocol handler 136.

Dynamic UX application 208 may correspond to application 122 and/or application 168, in some embodiments. Workflow module 210 and experience module 212 may correspond, respectively, to workflow module 126 and experience module 132. It should be appreciated that protocol handlers $PH_1$-$PH_n$ may be loaded into a middleware or network bus (e.g., communication interface 134) which may allow new protocol handlers to be developed and deployed alongside existing protocol handlers without affecting the uptime of existing protocol handlers.

Users 202A-202C may be of any number, and respectively may be human users and/or machines (e.g., automated scripts and/or APIs). Although three users are depicted, it should be understood that the methods and systems disclosed herein may support any number of users. Each of users 202A-202C may possess respective devices 204A-204C. Although each user is depicted, for simplicity, as possessing only one respective device, the methods and systems disclosed herein may support each user possessing or embodying a plurality of respective devices. For example, user 202A is depicted as possessing a mobile device 204A. However, in addition, or alternately, user 202A may possess a second mobile device 204B (not depicted). User 202A may access a dynamic UX application via either or both of mobile devices 204A and 204B.

Users 202A-202C may access dynamic UX application via respective devices 204A-204C, and respectively, via protocol handlers $PH_1$-$PH_n$. In some embodiments, device 204A may, for example, include multiple applications, each of which may access a different individual protocol handler in protocol handler middleware 206. In other embodiments, each device 204A-204C may include only one application, which may correspond for example to application 168, and which application may access one of protocol handlers $PH_1$-$PH_n$.

Each of protocol handlers $PH_1$-$PH_n$ may correspond to a different protocol, and may include logic for converting requests to canonical types, and may implement APIs for mapping requests to different resources. For example, $PH_1$ may be a protocol handler which corresponds to the HTTP protocol. A request from a user 204A-204C in HTTP may be routed, by protocol handler middleware 206, to $PH_1$ based on the request type. In some embodiments, routing may be achieved by examining the port number of an inbound network request, and routing the request based on the port number. For example, requests on port 80 may be assumed to be HTTP requests for purposes of protocol handler middleware 206. Although HTTP is discussed in the above example, many other protocols and sub-protocols are possible—including, without limitation, URL form encoded data, HTTP2, Telnet, Secure Shell (SSH), FTP, Gopher, UDP, TCP, comma-separated values, etc.

In an embodiment, a request passed to a protocol handler such as $PH_1$ in the above example may include both business data and metadata. For example, the request may include a referring IP address, a timestamp, a cookie, etc. The business data, or request payload, may include data relevant to one or more dynamic UX applications. For example, the request payload may include a new home address provided by a user in response to the execution of a step in the user's client device. Protocol handler $PH_1$, upon receipt of such a payload, may convert the payload into a canonical type (e.g., by performing an address standardization) and may transmit the canonical type to another module for further processing. For example, the canonical address may be transmitted to workflow module 210. In some embodiments, a payload may not be inspected by protocol handler middleware 206 and may, instead, be transmitted directly to workflow module 208. In some embodiments, individual steps of a given workflow may include logic for canonicalization of input types. Information pertaining to user 204A (e.g., a user ID or other information) may be transmitted from user device 204A to protocol handler middleware 206, and may be forwarded to other modules (e.g., workflow module 208 and experience module 212).

As discussed above, workflow module 210 may comprise a plurality of workflows (or paths), each comprising a plurality of steps that a user may complete to complete a workflow, corresponding to a business process. The number of steps presented to the user, and the order in which they are presented, may depend on one or both of the protocol handler middleware 206 and decisions made by experience module 212.

In operation, user 202A may want to complete a business process. For example, user 202A may want to apply for a new credit card. User 202A may access an application (e.g., by opening the application via an operating system menu) in mobile device 204A, wherein, for example, the device corresponds to mobile computing device 104 and the application corresponds to application 168. The application in device 204A may issue one or more request via a stateless protocol such as HTTP, wherein user 202A's state is emulated by the creation of a user session (e.g., a session created in an electronic database communicatively coupled to remote computing system 102 and associated with user 204A). The request may include an indication of user 202A's desired task, and the session may be associated with a path, or workflow corresponding to user 202A's desired task of applying for a new credit card. The request may be handled by a protocol handler such as $PH_1$ configured to handle requests received at a protocol-specific port (e.g., port 80). Protocol handler $PH_1$ may inspect the request and determine that it includes a payload indicating user 202A's desire to initiate a new credit card application, and that desire may be communicated to workflow 208. In some embodiments, user 202A's selections/requests may be converted to canonical types by protocol handler $PH_1$.

Upon receipt of user 202A's request, workflow module 208 may select the corresponding path/workflow (e.g., a path entitled "CREDIT CARD APPLICATION"). Workflow module 208 may instantiate a new instance of the path, and may call experience module 212, including a user ID parameter corresponding to user 202A, to determine whether any dynamic UX rules/instructions should be applied. Experience module 212 may determine that, for example, no instructions should be applied because experience module 212 lacks any information about user 202A. In other embodiments, experience module 212 may have information about user 202A and may cause workflow module 210 or one or more of protocol handlers $PH_1$-$PH_n$ to dynamically modify the UX displayed to user 202A in the execution of the credit card application path by, for example, modifying the response.

UX instructions may include any executable code or instructions. For example, experience module 212 may cause the color of a background to be changed. Experience module 212 may cause the ordering of steps shown to user 202A to be varied, and/or may cause the placement of text to be modified, and/or many other variations to occur. Then, based on a session, user identity, or other association, workflow module 210 may transmit a step to $PH_1$ in response to the request received from $PH_1$. The response may include an output of an executed step (e.g., an HTML form) or a step in a canonical representation. $PH_1$ may, based on the capabilities of device 204A, convert the canonical representation of the step into a device- or protocol-specific representation. For example, if the device 204A is a mobile application that supports HTML embedding, then $PH_1$ may convert the step to an HTML form. If the initial request received via 204A is an SMS message, then $PH_1$ may convert the step into a text-only response. Further because SMS may have a character limit per message, $PH_1$ may truncate a step, summarize the step, and convert non-textual aspects of the step to textual aspects (e.g., an image may be replaced by a hyperlink to the image).

In some embodiments, a user may switch devices before completing a workflow. For example, users 202A-202C may represent the same user 202 at three different points in time. At a first time, user 202 may be accessing a path P via an application executing in the application storage 166 of mobile device 204A. Path P may include nine required steps. User 202 may complete three of the steps using mobile device 204A. At a second time, user 202 may be driving a vehicle. User 202 may dial a telephone number via mobile device 204B which allows user 202 to authenticate and then offers user 202 (e.g., via an IVR system) the option to continue the in-progress path P. While driving, user 202 may successfully complete steps three more of the six remaining steps of path P. At a third time, user 202 may log in, via computing device 204C, to a user account associated with an application 122 running in a remote server (e.g., server 102), whereupon user 202 may be presented with an option to continue user 202's in-progress path P. User 202 may then complete the last three steps in the path. In some embodiments, user device 204C in the above example may correspond to mobile computing device 104 or server 102. In the foregoing example, the user's requests and responses may be routed through three different respective protocol handlers within protocol handler middleware 206. It should be appreciated that the foregoing example is merely one example of a single user accessing multiple steps via different devices, at different times, using different respective protocol handlers, and that any other suitable combination may be supported. It should also be appreciated that because request payloads may be converted to canonical types of a common format, the business logic processing the payloads in steps may remain the same. Generic protocol handlers allow data and processing logic to be completely decoupled.

In some embodiments, a separate protocol handler may be established for handling a narrow, special-purpose function related to the execution of a dynamic UX application in a client device. For example, a separate thread or process may be spawned that listens for user interface events and queues the events for transmission to a specific protocol handler middleware 206. The protocol handler middleware 206 may be individually configured to reject any requests that contain information that is not capable of being converted into a canonical type of "UI EVENT". Any requests that are capable of being converted into canonical type "UI EVENT" may be transmitted to a specific module (e.g., experience module 212) along with an indication of the user, so that the events may be stored in association with the user.

The above examples are described in terms of an end user accessing a dynamic UX application. It should be understood that in some embodiments, the same or similar techniques may be used to provide backend, or administrative, users the ability to administer dynamic UX applications. That is, a protocol handler middleware 206 may be configured which works as described above not with respect to the execution of a path and its associated steps, but rather with respect to the configuration and administration of that path and its associated steps. For this reason, protocol handlers 204 may be individually configured to have different levels of assurance with respect to user authentication. In some embodiments, a particular level of assurance may be required before an authenticated user is allowed to submit requests to, or receive responses from, a protocol handler.

Figure 3:
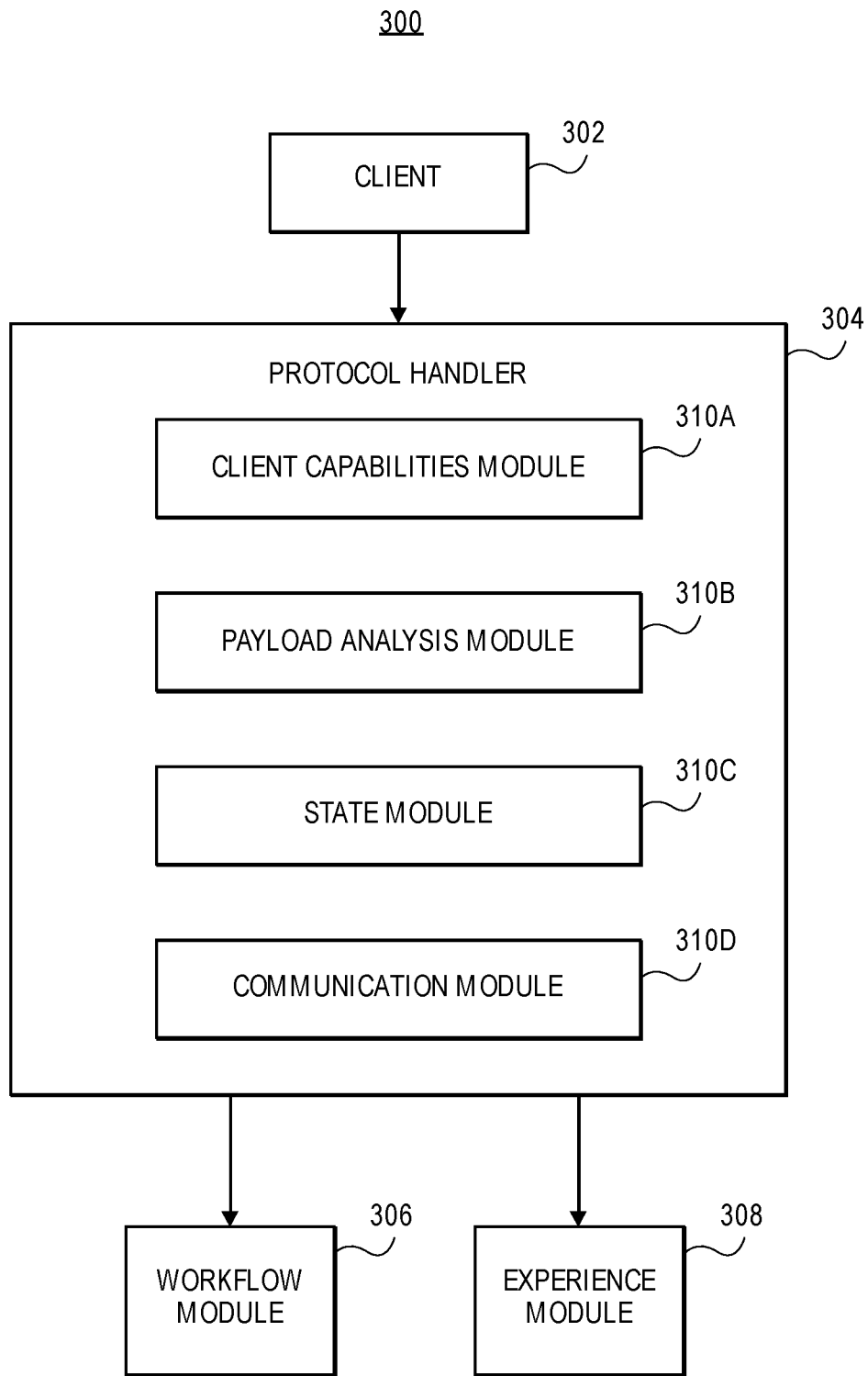
FIG. 3 depicts an exemplary flow diagram for handling requests from a client device in a protocol handler, according to one embodiment and scenario.

Turning to FIG. 3, an exemplary flow diagram for handling requests from a client device in a protocol handler to facilitate a dynamic UX application 300 is depicted, according to one embodiment. Dynamic UX application 300 may include a client 302 which may correspond to devices 204A-204C and/or mobile computing device 104, a protocol handler 304 which may correspond to protocol handler middleware 206 and/or protocol handler 136, a workflow module 306 which may correspond to workflow module 208 and/or workflow module 126, and experience module 308 which may correspond to experience module 212 and experience module 132.

Figure 4:
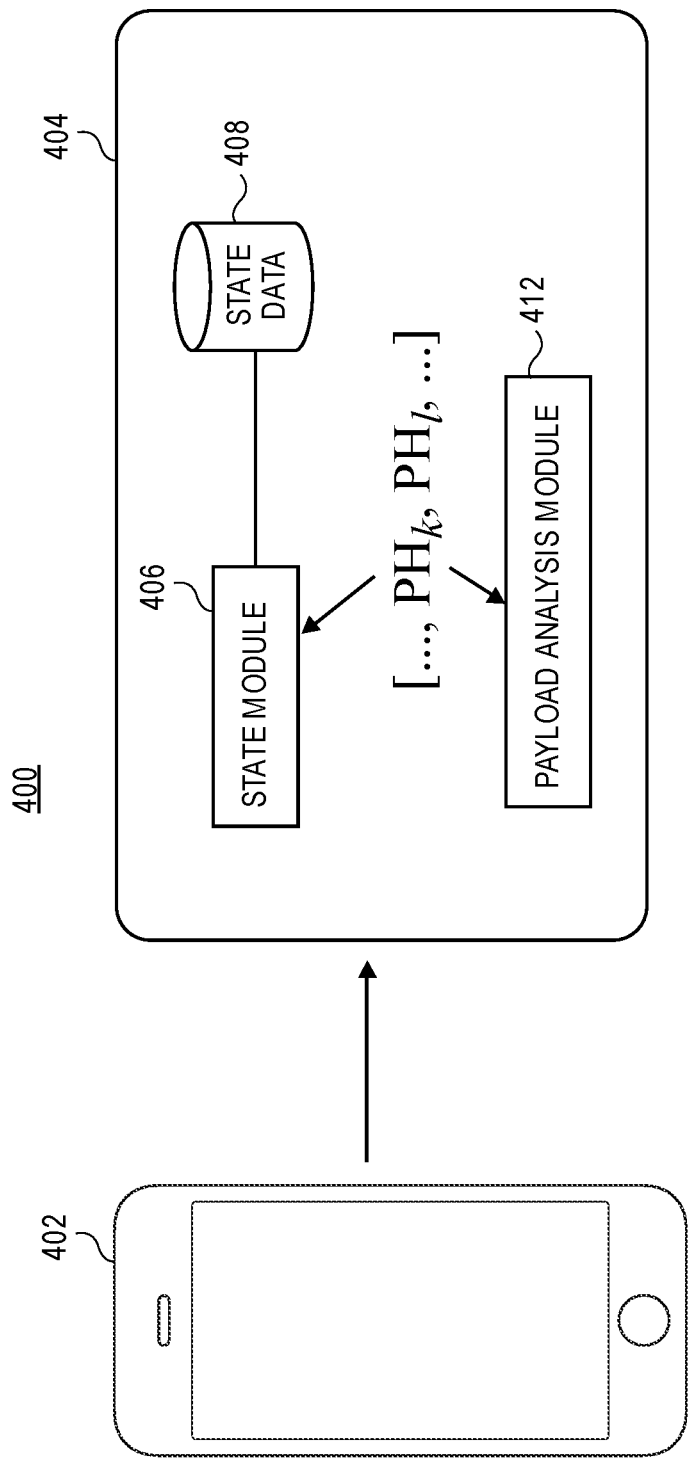
FIG. 4 depicts an exemplary system diagram for tracing the status of requests and responses in a protocol, according to an embodiment.

Protocol handler 304 may include modules 310A-310D, respectively, a client capabilities module, a payload analysis module, a state module, and a communication module. In some embodiments, client capabilities module 310A may include rules specifying which capabilities clients have, and such information may be based on one or more the protocol being used (e.g., SMS) and/or the client device type (e.g., mobile phone, desktop computing device, etc.). In some embodiments, client capabilities module 310A may query capabilities information from a module or electronic database communicatively coupled to protocol handler 304. Payload analysis module 310B may include instructions for analyzing the payload of a particular request type originating in client 302. For example, a first protocol handler 304 may include instructions for unpacking payloads from an HTTP request originating in client 302, whereas a second protocol handler 304 may include different instructions for unpacking payloads from SMS requests originating in client 302. As discussed with respect to FIG. 4, in some embodiments, unpacking/analyzing payloads originating in client 302 may be based on a series of foregoing responses sent to client 302 and/or requests received from client 302. State module 310C may track the state of one or more requests and responses, and may be used by protocol handler 304 in conjunction with payload analysis module 310B to determine message ordering. Communication module 310D may be used by protocol handler 304 to transmit and/or receive messages from other modules (e.g., workflow module 306 and experience module 308). For example, experience module 308 may issue UX instructions to workflow module 306 based on the execution of rules designed by UX architects.

In an embodiment, communication module 310D may execute in a separate thread or process, to prevent protocol handler 304 from being unable to process requests from client 302. Similarly, in some embodiments, protocol handler 304 may be implemented using any suitable parallel or threaded programming techniques. For example, a thread pool may be utilized, and/or work queues may be established to maintain request/response ordering. It should be noted that although modules 310A-310D are depicted as being integral to protocol handler 304, in some embodiments, each respective module 310A-310D may be located elsewhere. In some embodiments, multiple protocol handlers may share a single respective module 310A-310D (e.g., a first and second protocol handler may share a communication module 310D).

IV. Example Request Processing in a Protocol Handler to Determine Ordering of Requests in Unordered Protocols With respect to FIG. 4, an exemplary flow diagram 400 for tracing the progress of requests and responses in a protocol that lacks request and/or response order delivery and/or message sequencing is depicted, according to an embodiment. In some protocols, such as the SMS protocol, messages may be delivered out of order. Specifically, if a user A sends a group of messages $M_1, M_2, \ldots M_n$ to user B, then user B may receive messages in an arbitrary order (e.g., $M_2, M_1, \ldots M_n$). Similarly, responses $R_1, R_2, \ldots R_m$ sent by user B to user A may be similarly disordered when received by user B. Other protocols may suffer from the same ordering issues, but may include sufficient metadata (e.g. HTTP headers) to allow a client and/or server application to determine an ordering. Generally, without metadata (e.g., an indication in addition to the payload that a given message n corresponds to an order o) neither a client nor a server may be able to determine overall message order.

Flow diagram 400 may include a client 402 which may correspond to client 104, client 204A-204C, and/or client 302. Flow diagram 400 may also include a protocol handler middleware 404, which may correspond to communication interface 134 and/or protocol handler middleware 206. Protocol handler middleware 404 may include a state module 406, which may correspond to state module 310C, a state data store 408, an array of protocol handlers including protocol handlers $PH_k$ and $PH_l$ which may correspond, respectively, to protocol handler 136, any of protocol handlers $PH_1$-$PH_n$, and payload analysis module 412, which may correspond to payload analysis module 310B. As described above, SMS messages may include merely a payload, which information on its own may be insufficient to allow a client or server application to determine the order between pluralities of messages. In some embodiments, protocol handlers in protocol handler middleware 404 may be organized (e.g., sorted) according to the most frequently-accessed protocol handlers, in a hash map keyed by protocol identifier, or according to any other suitable scheme.

In an embodiment, state module 406 may create a record in state data store 408 each time a response is sent to client 402 based on certain circumstances (e.g., when the response message type is SMS or when state module 406 determines that client 402 corresponds to protocol known to lack ordering). The record created in state data store 408 may include an indication of the canonical type of information being requested from the user of client 402. For example, the user may be being asked to provide two pieces of information (e.g., a home address and business address). The record created in state data may denote the user, session, path, and or step with which the request is associated; the canonical type of the requested information, a respective timestamp, and/or a respective sequencing (e.g., an automatically incrementing primary key in an electronic database). In effect, the information stored in state data store 408 may be sufficient to allow a protocol handler (e.g., protocol handler $PH_k$ or $PH_l$) to determine the order of user requests. For example, in the above example, a protocol handler $PH_k$ may receive an SMS request from client 402, and may proceed to inspect the request payload. Upon doing so, protocol handler $PH_k$ may convert the payload to a canonical type. Then, protocol handler may call an API of state module 406, or query state data store 408 directly, passing the determined canonical type and an ID corresponding to a session, user ID, path, and/or step as parameters. State module 406 may query state data store 408 using the parameters, and may determine that, for example, two canonical types were requested with respect to the user, session, path, or step: ADDRESS and SOCIAL-SECURITY-NUMBER. State module 406 may determine that the canonical type of the information converted from the payload is PERSON-NAME, and that therefore, the user's SMS entry is invalid. On the other hand, state module 406 may determine that the canonical type of the information converted from the payload is ADDRESS. In this way, the information may be validated, and the response to which the request corresponds may be known, and thereby, requests may be disambiguated.

In some embodiments, a request may be passed from a protocol handler to a workflow manager, which may generate a response payload, and transmit the response payload to an experience manager. The experience manager may be protocol-aware, and may modify the response payload accordingly. For example, the experience manager may, in case the request protocol is an SMS message, format the response payload, including surrounding text, styling, etc. and then transmit the response payload to the protocol handler. The response payload may be encoded in a canonical data format common to the methods and systems described herein, and may be converted by the protocol handler to an SMS message format. In some cases, a protocol may be in use that does not support certain operations. An experience manager may include instructions or rules representing the operations supported by various protocols, and may include instructions for graceful degradation in cases wherein a protocol does not support a portion of a payload. For example, if a given protocol does not support images, then an experience manager may substitute a textual description of the image in place of the image. Similarly, experience manager may prevent some payloads from being sent via some protocols. For example, if an image is required to be displayed for legal or compliance reasons, then an experience manager may not allow a payload to gracefully degrade to a textual message, and may instead include a message in the response payload notifying the user that the current protocol may not be used, and providing a suggestion that the user use a different protocol.

In some embodiments, a protocol (e.g. SMS) may support messages of a fixed length, and or may only support delivery of a limited amount of information. For example, a step may require that a user answer three questions to complete the step. Concatenating more than one of the questions into a single message may exceed the fixed character limit of the SMS protocol. Therefore, a protocol handler may be configured which repeatedly evaluates the step, sending one question to the user, and waiting for a valid response (e.g., as determined by conversion to an acceptable canonical type) until all questions in the step have been answered.

It should be appreciated by those skilled in the art that some embodiments of the methods and systems described herein may be applicable to many different scenarios. For example, in an embodiment, a protocol handler middleware may be installed in a hardware appliance that is sold, leased, or otherwise provided to a company as a turnkey product. Therefore, in some embodiments, a party other than the owner of the methods and systems described herein may practice the methods and systems. Further, although methods and systems for processing requests and generating responses to facilitate the execution of paths and steps are described with respect to some embodiments, the methods and systems described herein may be used for other, more general, purposes.

Figure 5:
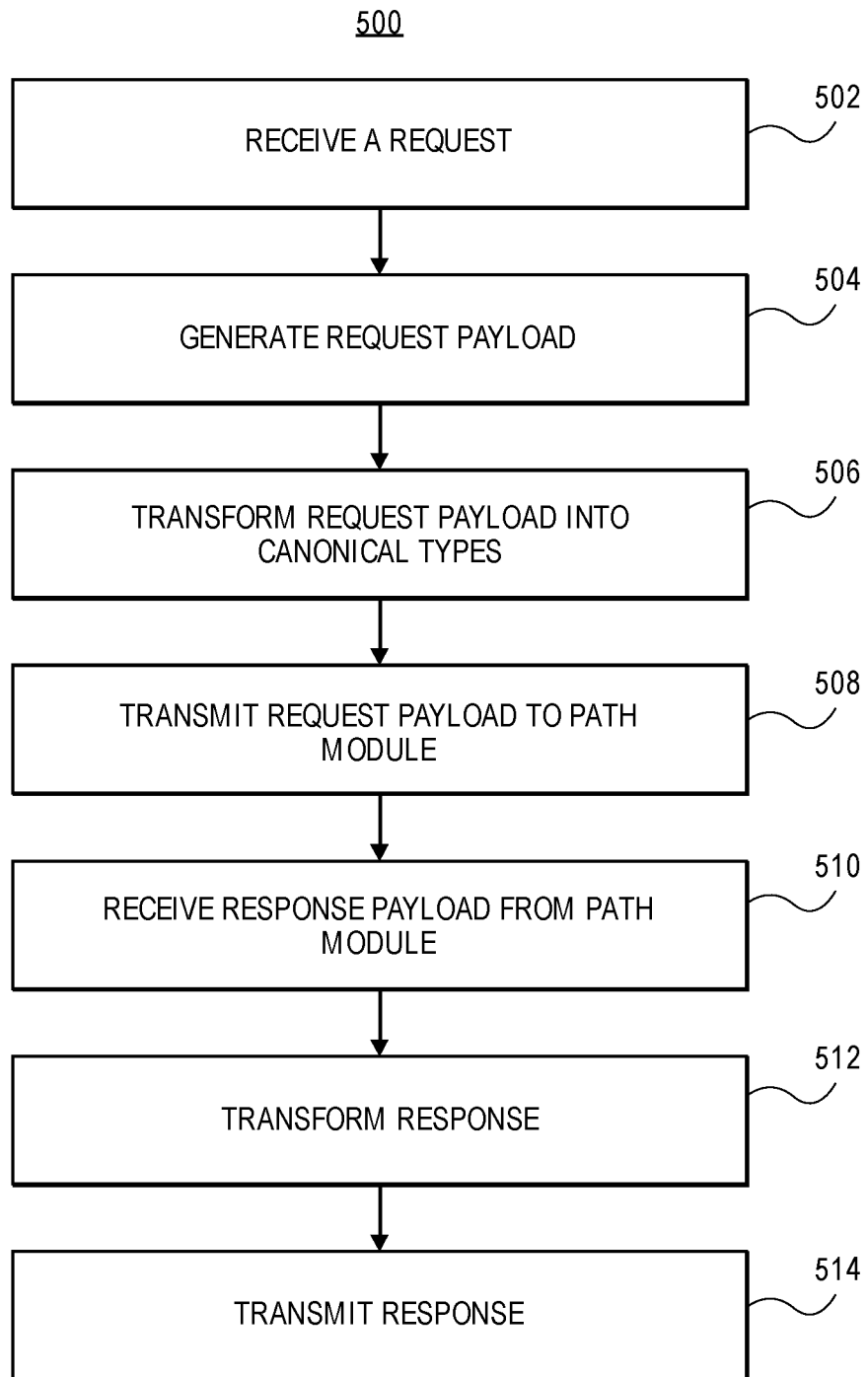
FIG. 5 depicts a flow diagram for an exemplary method of processing requests to facilitate dynamic UX applications.

V. Additional Example Request Processing in a Protocol Handler to Facilitate Dynamic UX Applications With respect to FIG. 5, an example method 500 for processing requests to facilitate dynamic UX applications is depicted, according to an embodiment. The method may include receiving a request from a client in a first protocol handler contained within a middleware (block 502). The request may be an electronic request as described above, and may correspond to a message or transmission as discussed above. The client may be a client as described above, and may correspond to client 104, one or more of client devices 204A-204C, client 302, client 402, etc. In some embodiments the client may be a device (e.g., a server) in which the method 500 is implemented. The middleware may correspond to communication interface 134, protocol handler middleware 206, or protocol handler middleware 404. The middleware may be implemented using any suitable technology. For example, the middleware may be a component in a web application framework. The middleware may be implemented as a load-balancing server, proxy server, and/or web server. The middleware may be configured to proxy requests to a pool of protocol handlers of a given type. For example, the middleware may proxy all HTTP requests to a pool of HTTP protocol handlers that may process requests according to a round-robin or other schedule. The first protocol handler may correspond to any of the protocol handlers described with respect to FIGS. 1-4.

The method 500 may also include generating a request payload based on a first protocol handler included in the middleware analyzing the request (block 504). In general, a payload is the "meat" of a request or response object. A request or response object may include other information, which may be referred to as metadata. Specifically, a request payload may be the data a client user typed into a web form, isolated from any payload metadata and/or request metadata. Payload metadata may include data about the payload, such as its size, content type, a timestamp, etc. Metadata may aany metadata associated with a given protocol used to transmit the payload. For example, an HTTP request may include protocol metadata such as HTTP headers. Generating a request payload may vary depending on the protocol. In some embodiments, generating the request payload may include parsing the request, extracting data at a fixed position, or any other suitable method. Each protocol handler and sub-protocol handler may include one or more respective set of instructions for generating the request payload.

The method 500 may also include transforming the request payload into a set of canonical types (block 506). The request may include a hash map of fields (e.g., an encoded HTML form), and converting the hash map of fields to a has map of canonical types may be performed by applying a transformation script to the hash map of fields, wherein each field in the hash map of fields is associated with a transformation function which contains a set of canonical conversion instructions for converting a field to a canonical type. Such conversion instructions may include, in some embodiments, natural language parsing, semantic analysis, or other forms of data normalization/canonicalization. In other embodiments, the request payload may not include any field names/mappings. For example, in a protocol without payload metadata (e.g., SMS), transforming the request payload into a set of canonical types may include successively applying a set of transformation instructions to a request payload value until a valid canonical type is found. As described with respect to FIG. 4, a state module may be utilized to track the expected response payload canonical type from a user. For example, a user may be asked a question in a response which solicits an integer answer. A record may be inserted into a state machine data store as described with respect to FIG. 4. When the user sends a request in answer to the response, and the request payload is analyzed, a request payload value of "five" may be found. Although the request payload provided by the user is a textual string, method 500 may contain instructions that are able to determine that an integer answer of five (5) was provided by the user, and may validate the entry. Transformation in systems that lack ordering may be achieved by the use of a payload analysis module as described with respect to FIG. 4.

It should be appreciated that in some embodiments, advantages may arise by offloading the transformation of request payloads into sets of canonical types into a separate thread or process, or into a module other than the protocol handler. Doing so may avoid doing computationally-expensive processing work within the middleware, and the advantages may be great if, for example, request/response payloads are large in size or high in volume.

The method 500 may also include transmitting the request payload, and/or the canonical types, to a path module (block 508). In some cases, transmission may be intra-device, and in others, may be inter-device. For example, a protocol handler may be implemented in a first server and a workflow module may be implemented in a second server. In that case, canonical types may be transmitted from the first server to the second server via a network (e.g., network 106). The canonical types may be compressed and/or serialized prior to being transmitted. In other embodiments, protocol handler and workflow module may exist in a single server. In that case, transmission may occur according to any suitable mechanism. For example, a protocol handler may write the set of canonical types to shared memory, a database, or a hard disk; and a workflow module may read the data from any such location. The set of canonical types may be associated with ordering or timing information, which may also be transmitted to the path module, in some embodiments. In general, any information in the user request and the request payload may be included in the set of information transmitted from the protocol handler to the path module. The method 500 may include receiving a response payload from the path module, wherein the response payload is associated with at least one of the canonical types (block 510). For example, the user may want to complete a path, P. The path P may be transformed into a canonical type as described above. Then, the canonical type corresponding to the path P may be transmitted to the path module. The path module may process a user request to complete a path P, and respond with a response payload which corresponds to the path P. In this way, the response payload is associated with the canonical type of the path P. However, it should be appreciated that in some embodiments, a response payload from a path module may not correspond to a canonical type. In general, protocol handlers may determine a routing for a request to a path by examining information in request metadata and payloads. For example, the name or ID of a path may be included in a request.

The method 500 may include transforming, by a second protocol handler included in the middleware analyzing the response payload, a response (block 512). The second protocol handler may or may not be the same protocol handler as the first protocol handler. That is, the protocol handler which handles transforming responses may not be the same protocol handler which handles transforming requests. As described above, a user may make a request using a first protocol (e.g., HTTP) and may switch devices or applications to a second protocol (e.g., IVR) within the execution of a single path. The middleware may contain a database table (e.g., in state data store 408) which includes an indication of the user's current protocol. The same information may be saved in a session associated with a user. The set of transformation instructions used to transform the response payload may depend on the identity of the second protocol handler. For example, if the second protocol handler is an SMS protocol handler, then the transformation instructions may be to send the request as plain text in 128-character strings. If the second protocol handler is IVR, then the transformation instructions may include instructions for converting the response from text to voice. As discussed above, additional transformation instructions may be provided by the experience manager.

The method 500 may include transmitting the response to a second computing system (block 514). In some embodiments, the middleware may transmit a session ID in addition to the canonical types transmitted to the workflow module, and may receive a response payload associated with the session from the workflow module. This may allow the middleware to transmit the response to the user via the appropriate, current, protocol. Transmission of the response may be accomplished via any suitable protocol, including email (SMTP), TCP/IP, HTTP, etc. In some cases, transmission to a user may be performed on a "best efforts" basis, as in the example of User Datagram Protocol (UDP).

ADDITIONAL CONSIDERATIONS

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart vehicle controller, or other smart devices). Of course, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2). In such instances, there may be no need for affirmative consent to be collected.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for a system and method for generating generic protocol handlers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A method, comprising:
   receiving, by a processor, a request associated with a step of a workflow;
   transforming, by the processor, information included in the request into data corresponding to a set of canonical types;
   transmitting, by the processor, the data to a workflow component of a first computing system, the workflow component:
   executing the step of the workflow based at least in part on the data, and generating a response payload associated with execution of the step, the response payload being characterized by at least one canonical type of the set of canonical types;
   receiving, by the processor, the response payload from the workflow component;
   generating, by a protocol handler of the processor, a response based on the response payload, the protocol handler formatting the response in accordance with a particular communication protocol of a second computing system; and
   transmitting, by the processor, via a network, and in accordance with the particular communication protocol, the response to the second computing system.

2. The method of claim 1, wherein the request includes metadata indicating at least a workflow component identification and a session identification, the method further comprising:
   identifying, by the processor and based on a first communication protocol associated with the request, a first protocol handler of the processor; and
   generating, by the first protocol handler and based on the metadata, a request payload associated with the request, wherein the request payload includes the data corresponding to the set of canonical types.

3. The method of claim 2, wherein the metadata includes information indicating a set of fields, and transforming the information comprises:
   identifying, for a field of the set of fields, a transformation function configured to convert the field to a canonical type; and
   generating, by applying the transformation function to the field, corresponding data of the canonical type.

4. The method of claim 1, further comprising:
   selecting, by the processor and based on the particular communication protocol of the second computing system, the protocol handler from one or more protocol handlers, each protocol handler of the one or more protocol handlers being associated with a respective communication protocol,
   wherein the one or more protocol handlers include protocol handlers for one or more of: an HTTP communication protocol, an HTTPS communication protocol, an SMS communication protocol, an IVR communication protocol, and an SMTP communication protocol.

5. The method of claim 1, further comprising:
   identifying, by the processor, a port number associated with the request; and
   determining, by the processor and based on the port number, a routing to the workflow component.

6. The method of claim 1, further comprising:
   identifying, by the protocol handler and by querying a database communicatively coupled to the protocol handler, client capabilities associated with the second computing system,
   wherein the response is generated based on the client capabilities.

7. The method of claim 6, further comprising:
   determining, by the protocol handler, that at least a portion of the response payload is unsupported by the client capabilities; and
   based on determining that at least the portion of the response payload is unsupported, at least one of degrading the response to match the client capabilities, and including an error message in the response.

8. The method of claim 7, wherein the error message includes:
an indication that the particular communication protocol cannot be used for the step of the workflow, and
an indication of a different communication protocol that can be used for the step of the workflow.

9. The method of claim 1, wherein the response, when executed by the second computing system, causes the second computing system to display user interface components configured to allow a user of the second computing system to interact with the step of the workflow.

10. The method of claim 1, wherein the set of canonical types comprises at least one of:
user interface event,
person name,
address,
person identification number,
telephone number, or
account number.

11. The method of claim 1, wherein at least one canonical type of the set of canonical types corresponds to a user interface event, the method further comprising:
transmitting, by the first computing system, the response payload to a user experience module; and
receiving, from the user experience module and based on the particular communication protocol, a modified response payload,
wherein the response is generated based on the modified response payload.

12. A computing system, comprising:
a processor; and
a non-transitory memory coupled to the processor and storing executable instructions that, when executed by the processor, cause the processor to perform operations comprising:
receiving, a request associated with a step of a workflow;
transforming information included in the request into data corresponding to a set of canonical types;
transmitting the data to a workflow component of the computing system, the workflow component:
executing the step of the workflow based at least in part on the data, and
generating a response payload associated with execution of the step, the response payload being characterized by at least one canonical type of the set of canonical types;
receiving, from the workflow component, the response payload;
generating, by a protocol handler of the processor, a response based on the response payload, the protocol handler formatting the response in accordance with a particular communication protocol of an electronic device; and
transmitting the response, via a network, and in accordance with the particular communication protocol, to the electronic device.

13. The computing system of claim 12, wherein the request includes metadata, the operations further comprising:
determining, based on the metadata, a routing to the workflow component.

14. The computing system of claim 12, wherein at least one canonical type of the set of canonical types corresponds to a user interface event, the operations further comprising:
transmitting the response payload to a user experience module; and receiving, from the user experience module and based on the particular communication protocol, a modified response payload,
wherein the response is generated based on the modified response payload.

15. The computing system of claim 12, the operations further comprising:
identifying client capabilities associated with the electronic device,
wherein the response is generated further based on the client capabilities.

16. The computing system of claim 15, the operations further comprising:
determining, by the protocol handler, that at least a portion of the response payload is unsupported by the client capabilities; and
based on determining that at least the portion of the response payload is unsupported, modifying the response payload to match the client capabilities.

17. A system, comprising:
a means for electronic communication via a communication network;
a means for storing executable instructions;
a means for displaying a user experience (UX) component; and
a means for executing the executable instructions, the means for executing being configured to:
receive, by the means for electronic communication, a request associated with a step of a workflow;
transform information included in the request into data corresponding to a set of canonical types;
transmit the data to a workflow component, the workflow component being configured to:
execute the step of the workflow based at least in part on the data, and generate a response payload associated with execution of the step, the response payload being characterized by at least one canonical type of the set of canonical types;
receive the response payload from the workflow component;
generate, by a protocol handler associated with a particular communication protocol of the means for displaying, a response based on the response payload, a response comprising a user interface component associated with an output of the execution of the step of the workflow; and
transmit the response, by the protocol handler and via the means for electronic communication, to the means for displaying, the response being configured such that when executed by the means for displaying, causes the means for displaying to display the user interface component.

18. The system of claim 17, wherein the means of executing being further configured to:
determine client capabilities associated with the means for displaying; and
modify, by a user experience module, the response in accordance with the client capabilities.

19. The system of claim 17, wherein the set of canonical types comprises at least one of: a user interface event, a person name, an address, a personal identification number, a telephone number or an account number, and the means of executing being further configured to:
identify a transformation function configured to convert the information included in the request to one or more canonical types; and generate, by applying the transformation function to the request, a request payload.

20. The system of claim 17, wherein transforming the information included in the request is based at least in part on metadata associated with the request, the metadata including at least one of: a workflow identifier, a session identifier, a user identifier, or an indication of a desired task.

* * * * *